(12) United States Patent
Wang et al.

(10) Patent No.: US 12,297,371 B2
(45) Date of Patent: May 13, 2025

(54) ANTIMICROBIAL AND ANTIVIRAL BUILDING PANELS

(71) Applicant: ARMSTRONG WORLD INDUSTRIES, INC., Lancaster, PA (US)

(72) Inventors: Michelle X. Wang, Lititz, PA (US); Ying Chang, Lancaster, PA (US); John E. Hughes, Lincoln University, PA (US); Linzhu Zhang, Pittsburgh, PA (US); Steven L. Masia, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 91 days.

(21) Appl. No.: 17/540,146

(22) Filed: Dec. 1, 2021

(65) Prior Publication Data

US 2022/0177711 A1 Jun. 9, 2022

Related U.S. Application Data

(60) Provisional application No. 63/120,862, filed on Dec. 3, 2020.

(51) Int. Cl.
| | |
|---|---|
| C09D 5/14 | (2006.01) |
| B05D 3/00 | (2006.01) |
| C08K 3/38 | (2006.01) |
| C09D 7/61 | (2018.01) |
| E04B 9/00 | (2006.01) |

(52) U.S. Cl.
CPC ............... C09D 5/14 (2013.01); C09D 7/61 (2018.01); E04B 9/001 (2013.01); B05D 3/007 (2013.01); B05D 2256/00 (2013.01); C08K 3/38 (2013.01); C08K 2003/387 (2013.01)

(58) Field of Classification Search
None
See application file for complete search history.

(56) References Cited

U.S. PATENT DOCUMENTS

| | | | |
|---|---|---|---|
| 2005/0158400 A1 | 7/2005 | Olsson | |
| 2005/0249880 A1* | 11/2005 | Wallace | B05D 7/08 427/372.2 |
| 2008/0233210 A1 | 9/2008 | Manning | |
| 2010/0034978 A1* | 2/2010 | Garuti, Jr. | C09D 5/14 427/403 |
| 2019/0062585 A1* | 2/2019 | Hughes | C09D 7/63 |
| 2019/0292780 A1* | 9/2019 | Baxter | E04B 9/12 |

FOREIGN PATENT DOCUMENTS

| | | |
|---|---|---|
| CN | 111218203 A | 6/2020 |
| EP | 0404752 A1 | 12/1990 |
| EP | 0525870 A1 | 2/1993 |
| EP | 0982120 A1 | 3/2000 |
| KR | 10-2006-0100424 A | 9/2006 |
| WO | WO 02/20676 A1 | 3/2002 |

(Continued)

*Primary Examiner* — Ramsey Zacharia
(74) *Attorney, Agent, or Firm* — Patrick Sheldrake

(57) ABSTRACT

Described herein is a building panel comprising: a substrate, and a coating applied to the substrate, the coating comprising a blend of an antimicrobial composition, a binder, and a pigment, wherein the antimicrobial composition consists essentially of zinc borate.

12 Claims, 3 Drawing Sheets

(56) References Cited

FOREIGN PATENT DOCUMENTS

| WO | WO 02/24817 A1 | 5/2002 |
| WO | WO 2014/029769 A1 | 2/2014 |
| WO | WO 2016/209758 A1 | 12/2016 |
| WO | WO 2018/005827 A1 | 1/2018 |
| WO | WO-2022040799 A1 * | 3/2022 |

* cited by examiner

ANTIMICROBIAL AND ANTIVIRAL BUILDING PANELS

CROSS-REFERENCE TO RELATED APPLICATIONS

This application claims the benefit of U.S. Provisional Application No. 63/120,862, filed on Dec. 3, 2020. The disclosure of the above application(s) is (are) incorporated herein by reference.

BACKGROUND OF THE INVENTION

The presence of bacteria, fungus, and/or viruses on surfaces is a major concern today affecting home, work, and recreational environments. Exposure to certain bacteria, fungi (or their spores), and/or viruses can seriously impact the health of humans, pets and other animals. Previous attempts at imparting protective properties to a building panel included applying an antibacterial and/or antifungal coating to a surface of a building material. However, such previous coatings required relatively large amounts of antibacterial and/or antifungal additives in order to impart sufficient protective activity to the coating, making such coatings expensive as well as potentially interfering with aesthetic properties of the coating. Additionally, such coatings failed to address virus environmental concerns. Thus, the need exists for a coating that can exhibit adequate protective performance with reduced amounts of such additives.

BRIEF SUMMARY OF THE INVENTION

The present invention may be directed to a building panel comprising a substrate; and a coating applied to the substrate, the coating comprising a blend of: an antimicrobial composition; a binder; and a pigment; wherein the antimicrobial composition consists essentially of zinc borate.

Other embodiments of the present invention may include a coating composition comprising: a liquid carrier; an antimicrobial composition; a binder; and a pigment; wherein the antimicrobial composition consists essentially of zinc borate.

Other embodiments of the present invention include a ceiling system comprising a support frame; and at least one of the aforementioned building panels, wherein the building panel is supported by the support frame.

Other embodiments of the present invention include a method of coating a substrate comprising: a) applying the aforementioned coating composition to a substrate; and b) drying the coating composition such that the liquid carrier is removed from the substrate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
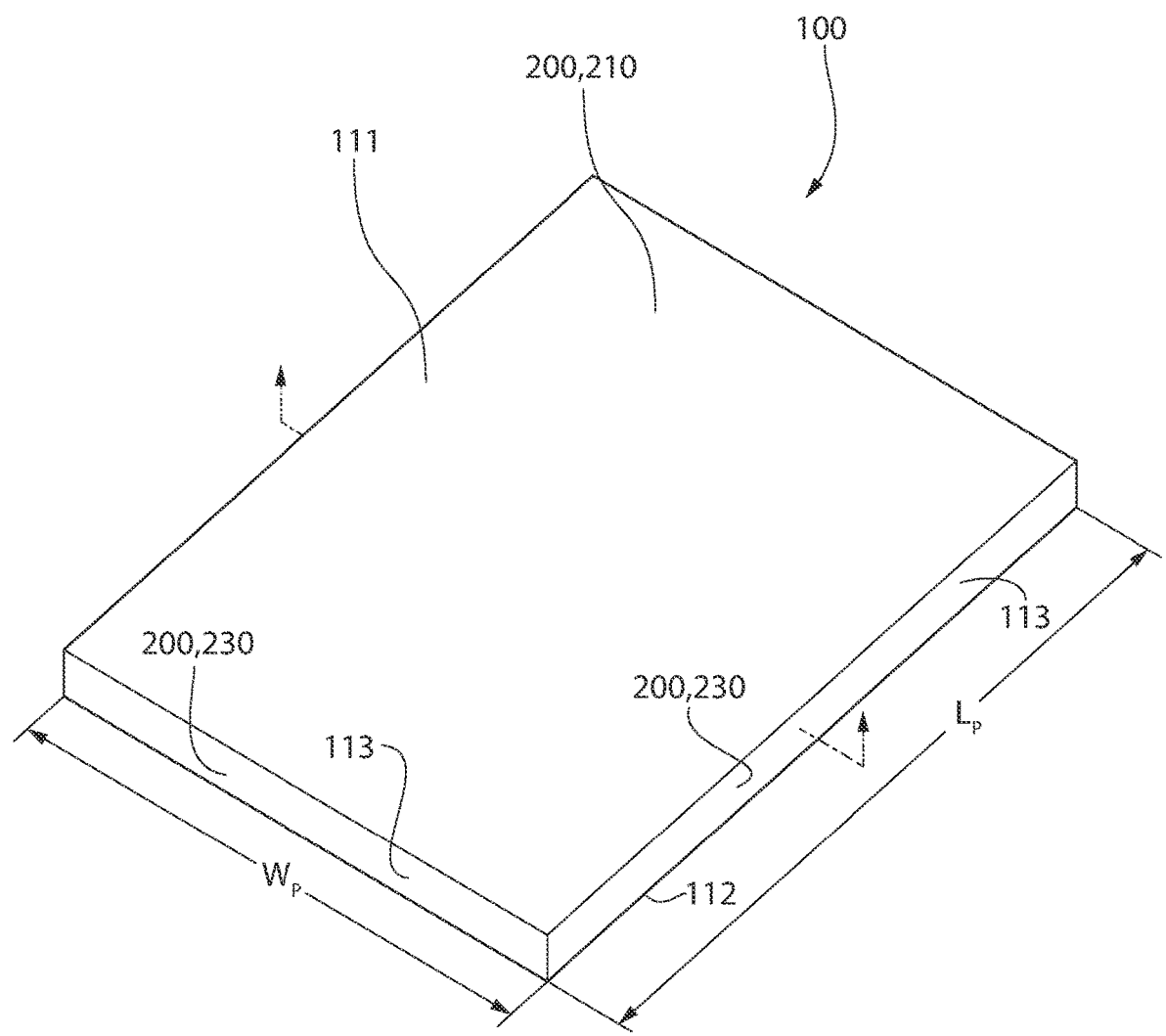
FIG. 1 is top perspective view of a coated building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

The present invention is directed to a protective coating (also referred to as the "coating") that exhibits antimicrobial activity. According to the present invention, a microbe may refer to a fungi source (e.g., mildew, mold), bacteria or bacterial growth, or a virus (a submicroscopic infectious agent that replicates only inside the living cells of an organism). According to the present invention, the term "antimicrobial activity" refers to a reduction in activity of a virus source, a bacteria source or growth, and/or a fungi source or growth. Accordingly, the term antimicrobial activity may refer to "antiviral," "antibacterial," and/or "antifungal" activity.

As described in greater detail herein, the protective coating may be applied such that the protective coating forms a portion of a coated building panel. The building panel may form part of a building system, whereby the building panel forms a ceiling panel or a wall panel.

Figure 2:
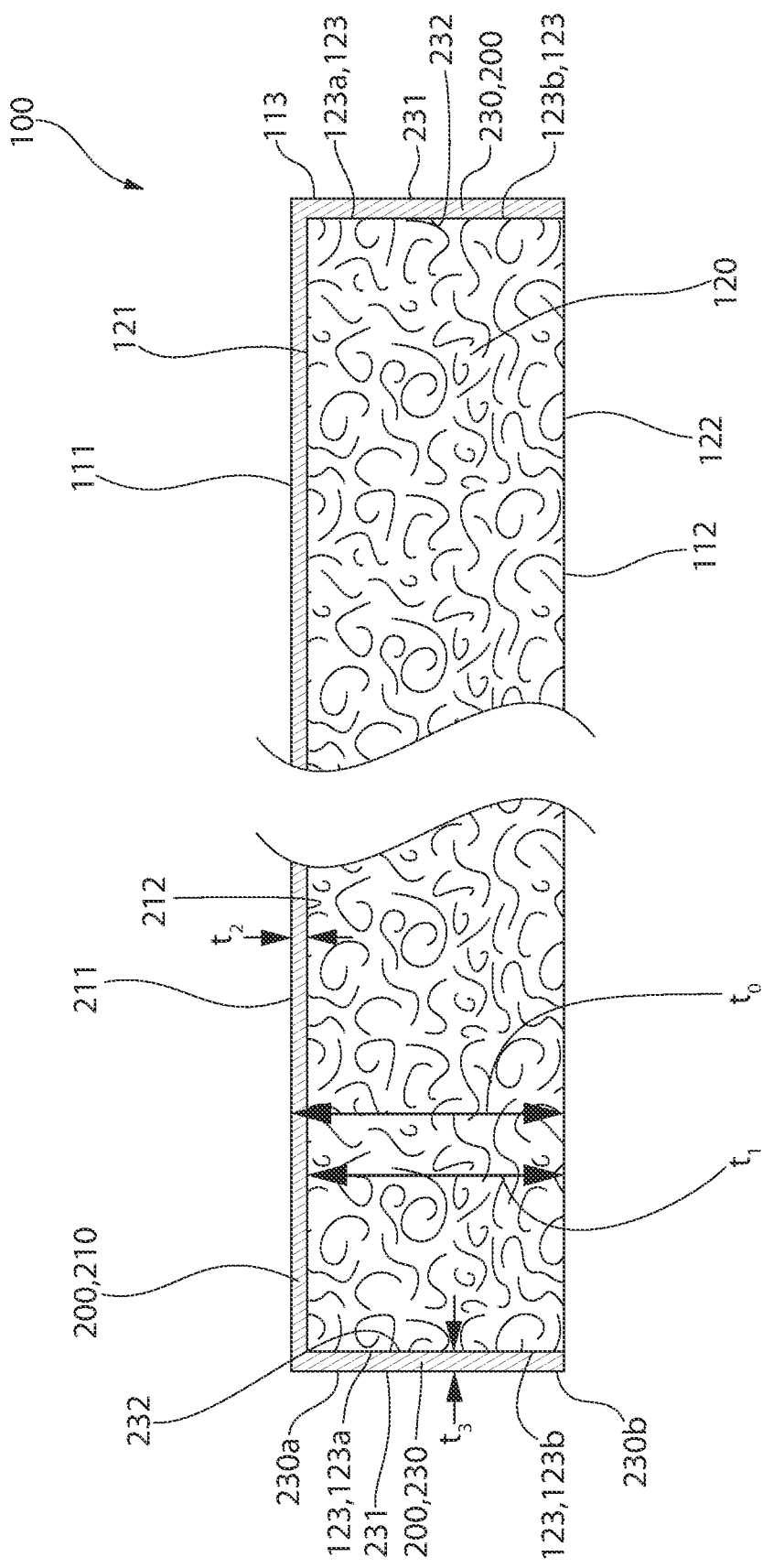
FIG. 2 is a cross-sectional view of the coated building panel according to the present invention, the cross-sectional view being along the II line set forth in FIG. 1.
Figure 3:
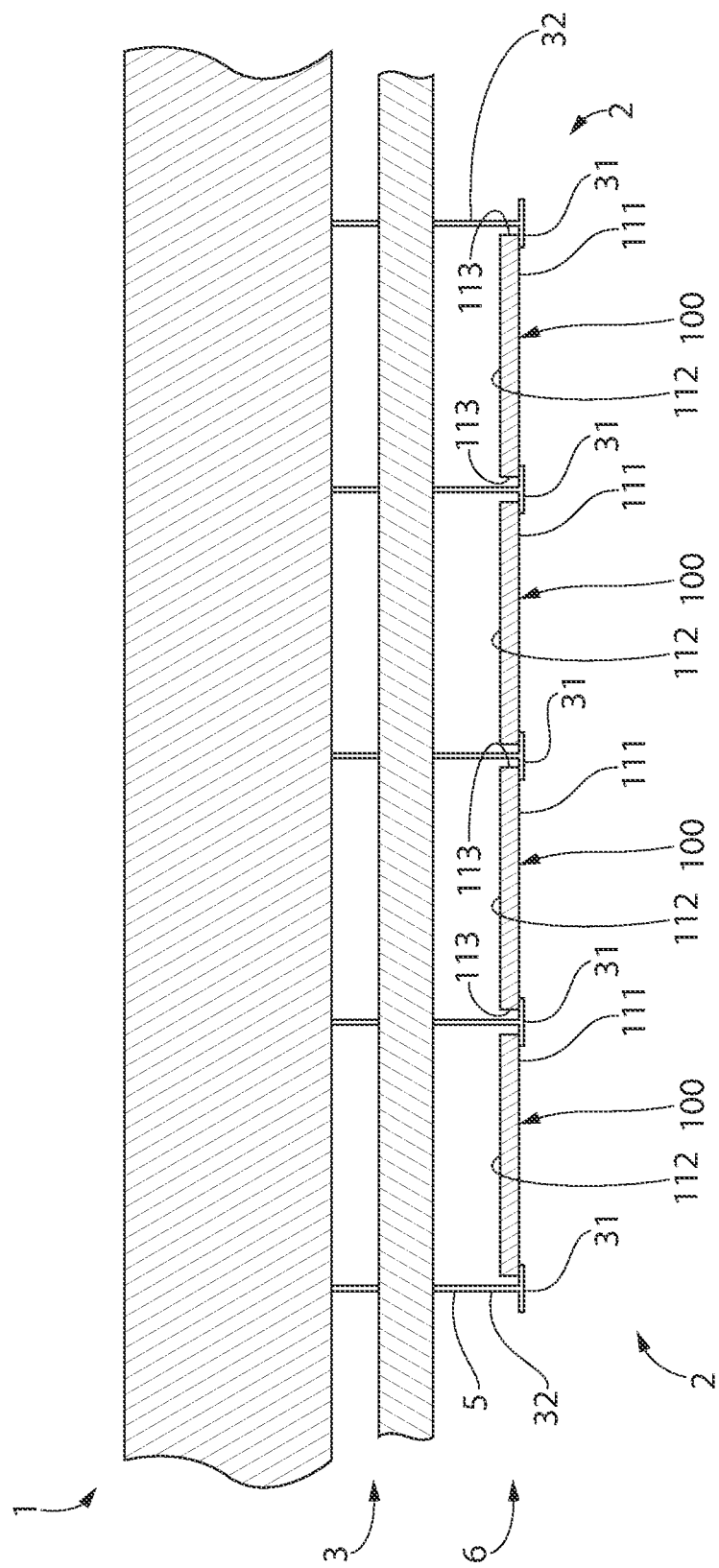
FIG. 3 is a ceiling system comprising the coated building panel of the present invention.

Referring to FIGS. 1-3, the present invention includes the coated building panel 100 (referred to herein as "building panel") comprising a first major surface 111 opposite a second major surface 112 and a side surface 113 that extends between the first major surface 111 and the second major surface 112, thereby defining a perimeter of the ceiling panel 100.

Referring to FIG. 3, the present invention may further include a ceiling system 1 comprising one or more of the building panels 100 installed in an interior space, whereby the interior space comprises a plenum space 3 and an active room environment 2. The plenum space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the building panels 100 may be supported in the interior space by one or more parallel support struts 5. Each of the support struts 5 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 6. The plenum space 3 exists above the ceiling support grid 6 and the active room environment 2 exists below the ceiling support grid 6.

In the installed state, the first major surface 111 of the building panel 100 may face the active room environment 2 and the second major surface 112 of the building panel 100 may face the plenum space 3. The building panel 100 may be installed such that the horizontal flange 31 contacts the first major surface 111 of the building panel 100, thereby vertically supporting the building panel 100 in the ceiling system 1.

Referring now to FIGS. 1 and 2, the building panel 100 of the present invention may have a panel thickness $t_0$ as measured from the first major surface 111 to the second major surface 112. The panel thickness $t_0$ may range from about 12 mm to about 40 mm—including all values and sub-ranges there-between. The building panel 100 may have a length $L_P$ ranging from about 30 cm to about 310 cm— including all values and sub-ranges there-between. The building panel 100 may have a width WP ranging from about 10 cm to about 125 cm—including all values and sub-ranges there-between.

The building panel 100 may comprise a body 120 and the protective coating 200 applied thereto—as discussed further herein. The body 120 comprises an upper surface 121 opposite a lower surface 122 and a body side surface 123 having an upper portion 123a and a lower portion 123b that extends between the upper surface 121 and the lower surface 122, thereby defining a perimeter of the body 120. The body 120 may have a body thickness $t_1$ that extends from the upper surface 121 to the lower surface 122. The body thickness $t_1$ may range from about 12 mm to about 40 mm—including all values and sub-ranges there-between.

The body 120 may be porous, thereby allowing airflow through the body 120 between the upper surface 121 and the lower surface 122—as discussed further herein. The body 120 may be comprised of a binder and fibers. In some embodiments, the body 120 may further comprise a filler and/or additive.

Non-limiting examples of binder may include a starch-based polymer, polyvinyl alcohol (PVOH), a latex, polysaccharide polymers, cellulosic polymers, protein solution polymers an acrylic polymer, polymaleic anhydride, epoxy resins, or a combination of two or more thereof. Non-limiting examples of filler may include powders of calcium carbonate, limestone, titanium dioxide, sand, barium sulfate, clay, mica, dolomite, silica, talc, perlite, polymers, gypsum, wollastonite, expanded-perlite, calcite, aluminum trihydrate, pigments, zinc oxide, or zinc sulfate.

The fibers may be organic fibers, inorganic fibers, or a blend thereof. Non-limiting examples of inorganic fibers mineral wool (also referred to as slag wool), rock wool, stone wool, and glass fibers. Non-limiting examples of organic fiber include fiberglass, cellulosic fibers (e.g. paper fiber—such as newspaper, hemp fiber, jute fiber, flax fiber, wood fiber, or other natural fibers), polymer fibers (including polyester, polyethylene, aramid—i.e., aromatic polyamide, and/or polypropylene), protein fibers (e.g., sheep wool), and combinations thereof.

The body 120 may be porous, thereby allowing airflow through the body 120 between the upper surface 121 and the lower surface 122 of the panel body 120. According to the present invention, the term porous refers to the body 120 being porous enough to allow for enough airflow through the body 120 under atmospheric conditions for the body 120 and the resulting building panel 100 to function as an acoustic building panel 100 and corresponding ceiling system 1 or wall system (not pictured) to function as an acoustical ceiling system or acoustical wall system, which requires properties related to noise reduction and sound attenuation properties—as discussed further herein.

Specifically, the body 120 of the present invention may have a porosity ranging from about 60% to about 98%— including all values and sub-ranges there between. In a preferred embodiment, the body 120 has a porosity ranging from about 75% to 95%—including all values and sub-ranges there between.

According to the embodiments where the body 120 is formed from binder and fibers, porosity may be calculated by the following:

$$\% \text{ Porosity} = [V_{Total} - (V_{Binder} + V_F + V_{Filler})]/V_{Total}$$

Where $V_{Total}$ refers to the total volume of the body 120 defined by the upper surface 121 the lower surface, and the body side surfaces 123 of the body 120. $V_{Binder}$ refers to the total volume occupied by the binder in the body 120. $V_F$ refers to the total volume occupied by the fibers in the body 120. $V_{Filler}$ refers to the total volume occupied by the filler in the body 120. Thus, the % porosity represents the amount of free volume within the body 120.

The body 120 of the present invention may exhibit sufficient airflow for the body 120 to have the ability to reduce the amount of reflected sound in an active room environment 2. The reduction in amount of reflected sound in an active room environment 2 is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The body 120 of the present invention exhibits an NRC of at least about 0.5. In a preferred embodiment, the body 120 of the present invention may have an NRC ranging from about 0.60 to about 0.99—including all value and sub-ranges there-between.

In addition to reducing the amount of reflected sound in a single active room environment 2, the body 120 of the present invention may also be able to exhibit superior sound attenuation—which is a measure of the sound reduction between an active room environment 2 and a plenary space 3. The ASTM has developed test method E1414 to standardize the measurement of airborne sound attenuation between room environments 2 sharing a common plenary space 3. The rating derived from this measurement standard is known as the Ceiling Attenuation Class (CAC). Ceiling materials and systems having higher CAC values have a greater ability to reduce sound transmission through the plenary space 3—i.e. sound attenuation function.

The body 120 of the present invention may exhibit a CAC value of 30 or greater. In some embodiments, the body 120 may exhibit a CAC value of 35 or greater.

The building panel 100 may further comprise the protective coating 200 applied to at least one of the upper surface 121 (also referred to the "upper major surface"), the lower surface 122 (also referred to the "lower major surface"), and/or the side surface 123 of the body 120.

As demonstrated by FIGS. 1-3, some embodiments include the protective coating 200 may include a face coating 210 that is applied to the upper surface 121 of the body 120 such that at least a portion of the protective coating 200 forms the first major surface 111 of the building panel 100. In other embodiments, the surface coating 200 may include an edge coating 230 that is applied to the side surface 123 of the body 120 such that at least a portion of the protective coating 200 forms the side surface 113 of the building panel 100. The edge coating 230 has an upper portion 230a, a lower portion 230b, and a thickness $t_3$ measured from the inside surface 232 to the outside surface 231 of the edge coating 230.

In other embodiments, the building panel 100 may comprise both the face coating 210 applied to the first major surface 121 of the body 120 as well as the edge coating 230 applied to the side surface 123 of the body 120 such that the protective coating 200 forms at least a portion of first major surface 111 and the side surface 113 of the building panel 100.

Although not shown, the present invention may include the protective coating 200 as a back coating that is applied to the lower surface 122 of the body 120 such that at least a portion of the protective coating 200 forms the second major surface 112 of the building panel 100.

The face coating 210 may comprise an upper surface 211 opposite a lower surface 212. The face coating 210 has a face coating thickness $t_2$—as measured from the upper surface 211 to the lower surface 212 of the face coating 210. The face coating thickness $t_2$ may range from about 200 μm (micron) to about 500 μm—including all thicknesses and sub-ranges there-between. The lower surface 212 of the face coating 210 may be in direct contact with the upper surface 121 of the body 120. The upper surface 211 of the face coating 210 may form at least a portion of the first major surface 111 of the building panel 100—as discussed further herein.

Although not shown, the building panel 100 of the present invention may further comprise a non-woven scrim. The non-woven scrim may comprise an upper surface opposite a lower surface. The lower surface of the non-woven scrim may be positioned immediately adjacent to and in direct contact with the upper surface 121 of the body 120. The face coating 210 may be applied to the non-woven scrim such that the lower surface 212 of the face coating 210 is in direct contact with the upper surface of the non-woven scrim.

The protective coating 200 may comprise a binder and a protective composition. In some embodiments, the protective coating 200 may further comprise a pigment, an additive, and/or a filler.

The protective coating 200, in the dry-state, may be present on the upper surface 121 of the body 120 (as the face coating 210) in an amount ranging from about 26 g/m² to about 450 g/m²—including all amounts and sub-ranges there-between. According to the present invention, the phrase "dry-state" indicates a composition that is substantially free of a liquid carrier (e.g., liquid water). Thus, the face coating 210 in the dry-state may comprise the all dry components (e.g., binder, protective composition, pigment) and less than about 0.1 wt. % of liquid carrier based on the total weight of the protective coating 200. In a preferred embodiment, the protective coating 200 in the dry-state has a solid's content of about 100 wt. % based on the total weight of the protective coating 200. Conversely, a composition that is in a "wet-state," which refers to a composition containing various amounts of liquid carrier—as discussed further herein.

The protective coating 200, in the dry-state, may be present on the lower surface 122 of the body 120 in an amount ranging from about 26 g/m² to about 450 g/m²—including all amounts and sub-ranges there-between.

The binder may be present in the protective coating 200 in an amount ranging from about 5 wt. % to about 20 wt. % based on the total dry-weight of the protective coating 200—including all wt. % and sub-ranges there-between. The binder may be polymeric. The binder may have a glass transition temperature ("Tg") that is greater than room temperature ("Tm")—wherein room temperature ranges from about 21° C. to about 40° C.—including all temperatures and sub-ranges there-between. In some embodiments, the first binder may have an overall charge that is anionic.

Non-limiting examples of the first binder include polymers selected from polyvinyl alcohol (PVOH), latex, an acrylic polymer, polymaleic anhydride, or a combination of two or more thereof. Non-limiting examples of latex binder may include a homopolymer or copolymer formed from the following monomers: vinyl acetate (i.e., polyvinyl acetate), vinyl propinoate, vinyl butyrate, ethylene, vinyl chloride, vinylidene chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methacrylate, hydroxyethyl acrylate, styrene, butadiene, urethane, epoxy, melamine, and an ester. Preferably the binder is selected from the group consisting of aqueous lattices of polyvinyl acetate, polyvinyl acrylic, polyurethane, polyurethane acrylic, polystyrene acrylic, epoxy, polyethylene vinyl chloride, polyvinylidene chloride, and polyvinyl chloride.

The protective composition may comprise protective component. The protective component may be referred to as an "antimicrobial component." The antimicrobial component may be the component that imparts the antimicrobial activity to the resulting coating. The antimicrobial component may be referred to as an "antiviral component" when the coating exhibits antiviral activity. The antimicrobial component may be referred to as an "antibacterial component" when the coating exhibits antibacterial activity. The antimicrobial component may be referred to as an "antifungal component" when the coating exhibits antifungal activity.

It has been discovered that the protective component of the present invention may be capable of imparts more than one type of antimicrobial activity to the resulting coating—therefore, the antiviral protective component may not preclude the protective component from simultaneously functioning as an antibacterial component and/or an antifungal component.

The protective component may comprise a metal borate. In some embodiments, the protective component may consist essentially of the metal borate. In some embodiments, the protective component may consist of the metal borate. In some embodiments, the protective composition may consist essentially of the protective component. In some embodiments, the protective composition may consist of the protective component. In some embodiments, the protective composition may consist essentially of the metal borate as the protective component.

In some embodiments, the protective composition may consist of the metal borate as the protective component.

According to the present invention, the metal borate of the first component refers to a compound corresponding to basic, dibasic, tribasic and polybasic metal borate(s), and mixtures thereof. For example, "zinc borate" refers to a group of compounds consisting zinc borate ($ZnB_4O_7$), any of the corresponding basic zinc borates (such as monobasic zinc borate of the structure $Zn(OH){\cdot}B_4O_7$, dibasic basic zinc borate of the structure $2Zn(OH)_2{\cdot}B_4O_7$, tribasic zinc borate of the structure $3Zn(OH)_3{\cdot}B_4O_7$ and the like), and mixtures thereof. As another example, "copper borate" refers to a group of compounds selected from the group consisting copper borate ($CuB_4O_7$), any of its the corresponding basic copper borates (such as monobasic copper borate of the structure $Cu(OH){\cdot}B_4O_7$, dibasic basic copper borate of the structure $2Cu(OH)_2{\cdot}B_4O_7$, tribasic copper borate of the structure $3Cu(OH)_3{\cdot}B_4O_7$, and the like), and mixtures thereof. The metal borate may include more than one metal. In a preferred embodiment, the metal borate is zinc borate.

The metal borate may be present in the protective composition in an amount of about 90 wt. % to about 100 wt. % based on the total weight of the protective composition. The metal borate may be present in the protective composition in an amount of about 100 wt. % based on the total weight of the protective composition.

In some embodiments, the protective composition is substantially free of sulfur-containing benzimidazole compounds. In some embodiments, the protective composition is substantially free of triazole compounds. In some embodiments, the protective composition is substantially free of 2,2-dibromo-3 nitrilopropionamide. In some embodiments, the protective composition is substantially free of biocides other than zinc borate.

The protective composition may be present in the protective coating 200 in an amount ranging from about 0.5 wt. % to about 20.0 wt. % based on the total dry-weight of the protective coating 200—including all wt. % and sub-ranges there-between. The protective composition may be present in the protective coating 200 in an amount ranging from about 2.0 wt. % to about 15.0 wt. % based on the total dry-weight of the protective coating 200—including all wt. % and sub-ranges there-between.

In some embodiments, the protective coating 200 may function as an antiviral protective coating in that the protective coating 200 helps speed the reduction of a viral load present on an exposed surface 111, 112, 113, of the building panel 100. In such embodiments, the protective coating 200 may comprise the protective composition in an amount ranging from about 7 wt. % to about 12 wt. %—whereby the protective composition consists essentially of metal borate.

In some embodiments, the protective coating 200 may function as an antibacterial and/or an antifungal or anti-mold protective coating in that the protective coating 200 helps speed the reduction of a microbial, fungal, and mold spreading spores that are present on an exposed surface 111, 112, 113, of the building panel 100. In such embodiments, the protective coating 200 may comprise the protective composition in an amount ranging from about 2.0 wt. % to about 12 wt. %—whereby the protective composition consists essentially of metal borate.

The pigment may be present in the protective coating 200 in an amount ranging from about 70 wt. % to about 95 wt. %—including all wt. % and sub-ranges there-between—based on the total dry-weight of the protective coating 200. Similar to the phrase "dry-state"—the phrase "dry-weight" refers to the weight of a component or composition without including any additional weight of liquid carrier. Thus, when calculating the dry weight of a component or composition, the calculation should be based solely on the weight of the solid components (e.g., pigment, binder, etc.), and should exclude any amount of residual liquid carrier that may still be present from the wet-state.

The pigment may be an inorganic pigment. The pigment may be selected from one or more of particles of carbon black, graphite, graphene, copper oxide, copper oxide containing glasses, iron oxide, zinc oxide, calcium carbonate, manganese oxide, titanium dioxide, calcium carbonate, silver halides, silver containing glasses, and combinations thereof. The inorganic pigments may include individual particles having colors selected from, but not limited to, red, blue, yellow, black, green, brown, violet, white, grey and combinations thereof.

The protective coating 200 may further comprise a dispersant. The dispersant may be present in the protective coating 200 in an amount ranging from about 0.1 wt. % to about 2.0 wt. % based on the total dry-weight of the protective coating 200—including all wt. % and sub-ranges there-between. In some embodiments, the dispersant may be present in the protective coating 200 in an amount ranging from about 0.1 wt. % to about 1.0 wt. % based on the total dry-weight of the protective coating 200—including all wt. % and sub-ranges there-between. The dispersant may be ionic in nature—i.e., comprise one or more ionic groups such as anionic group or cationic group. In a preferred embodiment, the ionic group is anionic.

According to some embodiments, the dispersant may comprise an anionic polyacrylic polymer having a salt group formed from a neutralization of an acid group with a compound forming a cation. For examples, the polymer may comprise one or more pendant side chains comprising a terminal carboxylic acid group that is neutralized with sodium or ammonia to form a carboxylate anion and a sodium cation and/or ammonium cation. Alternatively, the polymer may comprise one or more pendant side chains comprising a terminal sulfonic acid group that is neutralized with the aforementioned sodium or ammonia compounds to form a salt group.

The protective coating 200 may further comprise a rheology agent. The term "rheology agent" refers to a component capable of modifying the rheological properties (e.g., viscosity) if the protective coating in the wet-state. The rheology agent may be present in the protective coating 200 in an amount ranging from about 0.05 wt. % to about 0.5 wt. % based on the total dry-weight of the protective coating 200—including all wt. % and sub-ranges there-between. In some embodiments, the rheology agent may be present in the protective coating 200 in an amount ranging from about 0.1 wt. % to about 0.5 wt. % based on the total dry-weight of the protective coating 200—including all wt. % and sub-ranges there-between.

Non-limiting examples of rheology agent include thickeners. A non-limiting example of thickener includes natural cellulosics, e.g. hydroxyl ethyl cellulose-carboxymethyl cellulose, and polysaccharides. Inorganic thickeners, e.g. organoclay and hydrous magnesium aluminum-silicate. The synthetic thickeners, e.g. acrylic, HEUR, ASE.

The protective coating 200 may further comprise one or more of an additive include defoamers, wetting agents, flame retardants, and the like. The additive may be present in an amount ranging from about 0.01 wt. % to about 30 wt. % based on the total dry weight of the protective coating 200.

The protective coating 200 may further comprise a hydrophobic component. According to the present invention, the term "hydrophobic" means a composition or component that is difficult to wet and is capable of repelling liquid water under atmospheric conditions. Thus, as used herein, the term "hydrophobic" refers to a surface that generates a contact angle of greater than 90° with a reference liquid (i.e. water).

The hydrophobic component may be present in the protective coating 200 an amount ranging from about 0.1 wt. % to about 10 wt. % based on the total weight of the protective coating 200—including all value and sub-ranges there-between. In some embodiment, the hydrophobic component may be present in the protective coating 200 in an amount ranging from about 1 wt. % to about 8 wt. % based on the total dry-state weight of the protective coating 200—including all value and sub-ranges there-between. In some embodiments, the hydrophobic component may be present in an amount ranging from about 3 wt. % to about 5 wt. %, based on the total dry-state weight of the protective coating 200—including all value and sub-ranges there-between.

Non-limiting examples of the hydrophobic component include waxes, silicones, fluoro-containing additives, and combinations thereof—as discussed further herein.

The wax may have a number average molecular weight ranging from about 100 to about 10,000—including all values and sub-ranges there-between. The wax may have a melting point (Tm) ranging from about 0° C. to about 150° C.—including all values and sub-ranges there-between. In a preferred embodiment, the wax may have a melting point ranging from about 8° C. to about 137° C.—including all values and sub-ranges there-between.

Non-limiting examples of wax include paraffin wax (i.e. petroleum derived wax), polyolefin wax, as well as naturally occurring waxes and blends thereof. Non-limiting examples of polyolefin wax include high density polyethylene ("HDPE") wax, polypropylene wax, polybutene wax, polymethylpentene wax, and combinations thereof. Naturally occurring waxes may include plant waxes, animal waxes, and combination thereof. Non-limiting examples of animal waxes include beeswax, tallow wax, lanolin wax, animal fat based wax, and combinations thereof. Non-limiting examples of plant waxes include soy-based wax, carnauba wax, ouricouri wax, palm wax, candelilla wax, and combinations thereof.

The hydrophobic component may be applied as a water-based emulsion. The emulsion may be anionic or non-ionic. The emulsion may have a solid content (i.e., the amount of wax within the hydrophobic component) ranging from about 20 wt. % to about 60 wt. % based on the emulsion—including all value and sub-ranges there-between.

The wax may be present in an amount ranging from about 1 wt. % to about 8 wt. % based on the total dry-state weight of the protective coating 200—including all percentages and sub-ranges there-between. In some embodiments, the wax is present in an amount ranging from about 2.0 wt. % to about 5.0 wt. % based on the dry-weight of the protective coating 200—including all percentages and sub-ranges there-between.

The silicone may be selected from a silane, a siloxane, and blends thereof. Non-limiting examples of siloxane include dimethysiloxane, silsesquioxane, aminoethylaminopropyl silsesquioxane, octamethylcyclotetrasiloxane, and combinations thereof. In some embodiments, the siloxane may be hydroxyl terminated.

Non-limiting examples of silanes include saturated compounds having hydrogen and silicon atoms and are bonded exclusively by single bonds. Each silicon atom has 4 bonds (either Si—R or Si—Si bonds), wherein R may be hydrogen (H), or a C1-C10 alkyl group—including but not limited to methyl, ethyl, propyl, butyl, etc. Each R groups is joined to a silicon atom (H—Si bonds). A series of linked silicon atoms is known as the silicon skeleton or silicon backbone. The number of silicon atoms is used to define the size of the silane (e.g., $Si_2$-silane). A silyl group is a functional group or side-chain that, like a silane, consists solely of single-bonded silicon and hydrogen atoms, for example a silyl (—$SiH_3$) or disilanyl group. The simplest possible silane (the parent molecule) is silane, $SiH_4$.

Silanes used herein may be organofunctional silanes of formula:

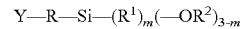

where Y is a hydroxyl group or a primary or secondary amino group and $R^1$ and $R^2$ are the same or different, monovalent, optionally substituted hydrocarbon groups which comprise between 1 and 12 carbon atoms and can be interrupted with heteroatoms. Silanes operative herein illustratively include an aromatic silane or an alkyl silane. The alkyl silane may comprise linear alkyl silane such as methyl silane, fluorinated alkyl silane, dialkyl silanes, branched and cyclic alkyl silanes etc. A non-limiting example of the silane is octyltriethoxysilane.

Non-limiting examples of a siloxane may include silicon oil, such as acyclic and/or cyclic dimethyl silicone oil—including but not limited to dimethylsiloxane, hexamethyldisiloxane, octamethyltrisiloxane, decamethylcyclopentasiloxane, octamethylcyclotetrasiloxane, and combinations thereof.

The silicone may be a water-based emulsion blend of silane and siloxane, such as commercially available IE-6682 from Dow Corning®, IE-6692 from Dow Corning®, and IE-6694 from Dow Corning®.

The fluoro-containing additives may comprise fluorocarbon-modified polyacrylate neutralized with dimethyl ethanol amine (DMEA) or a fluorosurfactant. The fluorosurfactant may be nonionic or anionic. The anionic moiety of the fluorosurfactant according to the present invention is selected from a sulfate, sulfonate, phosphate, or carboxylate moiety. According to some embodiments, the fluorosurfactant of the present invention may have at least one of the following formulas:

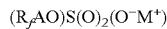  Formula I:

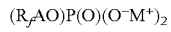  Formula II:

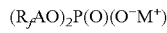  Formula III:

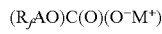  Formula IV:

wherein $R_f$ is a $C_1$ to $C_{16}$ linear or branched perfluoroalkyl, which may be optionally interrupted by one, two or three ether oxygen atoms.

A is selected from: $(CH_2CF_2)_m(CH_2)_n$; $(CH_2)_oSO_2N(CH_3)(CH_2)_p$; $O(CF_2)_q(CH_2)_r$; or $OCHFCF_2OE$;

m is 0 to 4;

n, o, p, and r, are each independently 2 to 20;

q is 2;

E is a $C_2$ to $C_{20}$ linear or branched alkyl group optionally interrupted by oxygen, sulfur, or nitrogen atoms; a cyclic alkyl group, or a $C_6$ to $C_{10}$ aryl group;

M is a Group I metal or an ammonium cation $(NHx(R_2)y)^+$, wherein $R_2$ is a $C_1$ to $C_4$ alkyl; x is 1 to 4; y is 0 to 3; and x+y is 4.

The defoamer may be present in an amount ranging from about 0.05 wt. % to about 0.2 wt. % (including all values and sub-ranges there-between)—based on the total weight of the protective coating 200 in the dry-state.

Non-limiting examples of defoamer may include polyalphaolefin formed from one or more monomers of 1-hexene, 1-heptene, 1-octene, 1-nonene, 1-decene, 1-undecene, 1-tridecene, 1-tetradecene, 1-pentadecene, 1-hexadecene, 1-octadecene, 1-heptadecene, and 1-nonadecene; a high density polymer selected from oxidized ethylene homopolymers, polyethylene homopolymers, and polypropylene homopolymers; a silicone oil, polypropylene glycol, and diethylenetriamine; and a non-ionic surfactant compound selected from polyether modified polysiloxane, polyethylene glycol oleate, and polyoxypropylene-polyoxyethylene copolymer—as well as mixtures thereof.

The coating of the present invention may further comprise filler. The filler may comprise one or more inorganic particles. Non-limiting examples of such inorganic particles include limestone, calcium carbonate, clay, dolomite, talc, perlite, gypsum, calcite, aluminum trihydrate, zinc oxide, and combinations thereof. The inorganic particles may have a particle size ranging from about 0.1 µm to about 300 µm—including all values and sub-ranges there-between. The inorganic particles may be present in an amount ranging from about 0 wt. % to about 95 wt. % (including all values and sub-ranges there-between)—based on the total weight of the protective coating 200 in the dry-state.

The protective coating 200 may be formed by applying a coating composition in the wet-state. The coating composition may comprise the dry components of the protective coating 200 (e.g., the binder, the protective agent, the pigment, the dispersant, etc.) blended with a liquid carrier. The liquid carrier may be selected from water, VOC solvent—such as acetone, toluene, methyl acetate—or combinations thereof. In some embodiments, the liquid carrier may be water and comprises less than 1 wt. % of VOC solvent based on the total weight of the liquid carrier.

The coating composition may have a solid's content of at least 15 wt. % based on the total weight of the coating composition in the wet-state. Stated otherwise, the liquid carrier is present in a maximum amount of about 85 wt. % based on the total weight of the coating composition in the wet-state.

The solids content of the coating composition in the wet-state may range from about 15 wt. % to about 80 wt. %—including all wt. % and sub-ranges there-between. In a preferred embodiment, the solids content of the coating composition in the wet-state may range from about 20 wt. % to about 70 wt. % based on the total weight of the coating composition—including all wt. % and sub-ranges there-between. In some embodiments, the coating composition in the wet-state may have a solids content ranging from 54 wt. % to about 68 wt.—including all wt. % and sub-ranges there-between. % based on the total weight of the coating composition.

The solid's content is calculated as the fraction of materials present in the wet-state coating composition that are not the liquid carrier. Specifically, the solid's content of the wet-state coating composition may be calculated as the amount of binder, filler, pigment, dispersant, defoamer, protective agent, flame retardant, in the dry-state coating composition and dividing it by the total weight of the coating composition in the wet-state (including both solid components and liquid carrier).

Therefore, the amount of each component in the wet-state coating may be calculated by multiplying the desired amount of each of the dry component (e.g., pigment, protective agent) that is present in the protective coating 200 in the dry-state by the total solids content of the coating composition in the wet-state. For example, for a protective coating 200 in the dry-state comprising about 70 wt. % of pigment, whereby that protective coating 200 is was applied as a wet-state coating composition having a solids content of 65 wt. %—the amount of the pigment in the wet-state coating composition would be 45.5 wt. % based on the total weight of the coating composition in the wet-state—i.e., 70 wt. %×0.65=45.5 wt. % of pigment in the coating composition in the wet-state.

The coating composition in the wet-state may have a pH ranging from about 6.0 to about 9.5—including all pH values and sub-ranges there-between. In some embodiments, the coating composition in the wet-state may have a pH value ranging from The coating composition in the wet-state may have a pH ranging from about 8.0 to about 9.0—including all pH values and sub-ranges there-between. The coating composition in the wet-state may have a density ranging from about 8.5 to 15 lb./gal—including all densities and sub-ranges there-between.

The coating composition in the wet-state may be applied to one of the upper surface 121, the lower surface 122, and/or the side surface 123 of the body 120 in an amount ranging from about 26 g/m² to about 450 g/m²—including all sub-ranges and values there-between. The coating composition in the wet-state may be applied by roll coating, brush coating, and spray coating, and/or curtain blade.

Specifically, the coating composition may be dried from the wet-state to the dry-state in a conventional oven at a first elevated temperature for a first drying period. The first elevated temperature may range from about 67° C. to about 232° C.—including all sub-ranges and temperature there-between. In some embodiments, the first elevated temperature may range from about 67° C. to about 190° C.—including all sub-ranges and temperature there-between. In some embodiments, the first elevated temperature may range from about 93° C. to about 232° C.—including all sub-ranges and temperature there-between.

The first drying period may range from about 10 seconds to about 120 seconds—including all sub-ranges and temperature there-between.

The protective coating 200 in the dry-state may be substantially continuous. The term "substantially continuous" refers to less than 5% of the available surface area on the referenced surface contains pin-holing or blistering. The protective coating 200 may be substantially continuous such that the acoustic properties of the body 120 are not substantially hindered, thereby allowing the resulting building panel 100 to also function as an acoustical building panel. Stated otherwise, even with the protective coating 200 applied to one or more of the upper surface 121, the lower surface 122, and/or the side surface 123 of the body 120, the overall building panel 100 may still exhibit acoustical properties (i.e., NRC and CAC performance) substantially equal to and/or overlapping with that of the naked body The building panel of the present invention may be a ceiling panel or tile, wall panel, wall covering (e.g., wallpaper) or directly to a wall (e.g., painted dry wall, wood wall paneling, such as wainscot, baseboard molding, crown molding). In other embodiments, the coating composition may be applied directly to a glass surface (e.g., a door, a window, etc.). In other embodiments of the present invention, the coating composition may be applied various textiles—such as felts, upholstery, or window hangings (e.g., curtains), and various paper products (e.g., paper towels, coated paper, cardboard, and the like), decorative shower-curtaining liners. In other embodiments, the coating composition may be applied to a window blind (formed from cellulosic material, polymeric material, or inorganic material). The coating composition may be applied to other various indoor surfaces for the purpose of reducing VOCs and odor in a closed-environment. In other embodiments, the coating composition may be applied to packaging products (e.g., styrofoam, recycled packaging).

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

EXAMPLES

Experiment 1

The first experiment includes Example 1 and Comparative Examples 1-3, which demonstrate the unexpected antiviral benefit of adding only zinc borate to a coating composition as the antimicrobial agent without detrimentally impacting the desired aesthetic performance of the coating.

The binder of the following examples includes a carboxylated polyvinyl acetate homopolymer at a solid's content of 50 wt. %, having a Tg of about 37° C., and having a pH ranging between 7 and 8. The rheology agent ("RA") of the following examples includes hydroxyethyl cellulose. The pigment composition of the following examples include a blend of $TiO_2$ and $CaCO_3$. The flame retardant of the following examples includes aluminum hydroxide. The hydrophobic agent ("HA1") of the following examples includes a silicon emulsion. The dispersant ("Dispersant 1") of the following examples includes an ionic surfactant (sodium polyacrylate). The antimicrobial agents of the following examples include:

Antimicrobial Agent 1 ("AA1"): triazole compound

Antimicrobial Agent 2 ("AA2"): 2,2-dibromo-3 nitrilo-propionamide ("DBNPA")

Antimicrobial Agent 3 ("AA3"): Zinc Borate

The dry formulation of each coating of Comparative Examples 1-3 and Example 1 are set forth in Table 1—the amounts of Table 1 are weight percent of dry mass.

TABLE 1

|  | Comp. Ex. 1 | Comp. Ex. 2 | Comp. Ex. 3 | Ex. 1 |
| --- | --- | --- | --- | --- |
| Binder | 12.14 | 12.14 | 12.14 | 12.14 |
| AA1 | 0.48 | 0.48 | — | — |
| AA2 | 0.08 | — | 0.08 | — |
| AA3 | 9.53 | — | — | 9.53 |
| Pigment | 68.07 | 77.55 | 77.95 | 68.63 |
| Flame Retardant | 9.40 | 9.53 | 9.53 | 9.40 |
| RA | 0.16 | 0.16 | 0.16 | 0.16 |
| Defoamer | 0.02 | 0.02 | 0.02 | 0.02 |
| Dispersant 1 | 0.12 | 0.12 | 0.12 | 0.12 |
| Total Solids | 100% | 100% | 100% | 100% |

In the wet-state, each coating formulation of Comparative Examples 1-3 and Example 1 had liquid carrier added to achieve the desired solids content. The solid's content of each coating in the wet-state is set forth in Table 2—the amounts of Table 2 are weight percent. Additionally, each wet-state coating formulation was evaluated for pH and density—as set forth in Table 2.

TABLE 2

|  | Comp. Ex. 1 | Comp. Ex. 2 | Comp. Ex. 3 | Ex. 1 |
| --- | --- | --- | --- | --- |
| Solid Content Amount | 63.8 | 63.7 | 64.6 | 63.8 |
| Liquid Carrier Amount | 36.2 | 36.3 | 35.4 | 36.2 |
| Total Amount | 100 | 100 | 100 | 100 |
| Density (lb./gal) | 12.2 | 12.1 | 12.3 | 11.3 |
| pH | 7.96 | 8.06 | 7.86 | 8.18 |

Each coating formulating was then applied to a substrate and dried, whereby the dried coating was evaluated for opacity and color L, a, b, Y values—the evaluation values are set forth below in Table 3. Additionally, each coating was further evaluated for viral reduction characteristics when compared against the Coronavirus-229E virus—the results also set forth below in Table 3.

TABLE 3

|  | Comp. Ex. 1 | Comp. Ex. 2 | Comp. Ex. 3 | Ex. 1 |
|---|---|---|---|---|
| Opacity | 98.7% | 98.7% | 98.6% | 99.5% |
| Color - White | | | | |
| L | 97.33 | 97.25 | 97.3 | 97.12 |
| a | −0.50 | −0.43 | −0.49 | −0.78 |
| b | 1.72 | 1.72 | 1.77 | 1.56 |
| Y | 93.52 | 93.06 | 93.3 | 92.75 |
| Color - Black | | | | |
| L | 96.95 | 96.76 | 96.82 | 96.91 |
| a | −0.66 | −0.6 | −0.67 | −0.91 |
| b | 1.36 | 1.32 | 1.45 | 1.1 |
| Y | 92.33 | 91.85 | 91.99 | 92.25 |
| Virus Log Reduction After 30 Minutes | 4.27 | 3.77 | 3.77 | 3.02 |
| Percent Viral Kill After 30 Minutes | 99.995 | 99.983 | 99.983 | 99.905 |

As demonstrated by Table 3, the coating of Example 1 exhibited enhanced opacity at an even lower pigment loading percentage compared to Comparative Examples 1-3 while also exhibit similar color value performance. Additionally, the coating of Example 1 exhibited comparable viral kill compared to Comp. Ex. 1-3. Although the viral reduction of Comp. Ex. 1-3 exceeded that of Ex. 1, the coating of Ex. 1 met the minimum standard of viral reduction (i.e., Log 3 after 30 Minutes time) while also achieving the desired aesthetic properties with only a single antimicrobial agent—i.e., including only AA3. Thus, the coating of Ex. 1 represents an unexpected synergy in antimicrobial/antiviral coatings comprising only zinc borate as the antimicrobial agent.

Experiment 2

The second experiment includes Example 2 and 3 and Comparative Examples 4-9, which further demonstrate the synergistic benefit of adding only zinc borate to a coating composition as the antimicrobial agent without detrimentally impacting the desired aesthetic performance of the coating.

The binder of the following examples includes a carboxylated polyvinyl acetate homopolymer at a solid's content of 50 wt. %, having a Tg of about 37° C., and having a pH ranging between 7 and 8. The rheology agent ("RA") of the following examples includes hydroxyethyl cellulose. The pigment composition of the following examples include a blend of $TiO_2$ and $CaCO_3$. The flame retardant of the following examples includes aluminum hydroxide. The hydrophobic agent ("HA") of the following examples includes a blend of paraffin wax and polyethylene.

The antimicrobial agents of the following examples include the additional components:
Antimicrobial Agent 4 ("AA4"): Cinaminaldehyde
Antimicrobial Agent 5 ("AA5"): Cerium oxide
Antimicrobial Agent 6 ("AA6"): Thymol
Antimicrobial Agent 7 ("AA7"): Zinc Sulfate
Antimicrobial Agent 8 ("AA8"): B Analine The dry formulation of each coating of Comparative Examples 1-3 and Example 1 are set forth in Table 1—the amounts of Table 4 are weight percent of dry mass.

TABLE 4

|  | Comp. Ex. 4 | Comp. Ex. 5 | Comp. Ex. 6 | Comp. Ex. 7 | Comp. Ex. 8 | Comp. Ex. 9 | Ex. 2 | Ex. 3 |
|---|---|---|---|---|---|---|---|---|
| Binder | 10.33 | 10.33 | 10.33 | 10.33 | 10.4 | 10.33 | 10.33 | 10.33 |
| AA3 | — | — | — | — | — | — | 9.05 | 3.01 |
| AA4 | — | — | — | 3.01 | — | — | — | — |
| AA5 | — | 3.01 | — | — | — | — | — | — |
| AA6 | 0.46 | — | 3.01 | — | — | — | — | — |
| AA7 | — | — | — | — | 0.62 | — | — | — |
| AA8 | — | — | — | — | — | 3.01 | — | — |
| Pigment | 73.82 | 71.27 | 70.0 | 71.27 | 72.28 | 71.27 | 65.23 | 71.27 |
| Flame Retardant | 10.62 | 10.62 | 10.62 | 10.62 | 10.62 | 10.62 | 10.62 | 10.62 |
| RA | 0.15 | 0.15 | 0.15 | 0.15 | 0.15 | 0.15 | 0.15 | 0.15 |
| Defoamer | 0.09 | 0.09 | 0.09 | 0.09 | 0.09 | 0.09 | 0.09 | 0.09 |
| HA | 3.87 | 3.87 | 3.87 | 3.87 | 3.90 | 3.87 | 3.87 | 3.87 |
| Dispersant | 0.66 | 0.66 | 1.93 | 0.66 | 1.94 | 0.66 | 0.66 | 0.66 |
| Total Solids | 100% | 100% | 100% | 100% | 100% | 100% | 100% | 100% |

In the wet-state, each coating formulation of Comparative Examples 4-9 and Examples 2 and 3 had liquid carrier added to achieve the desired solids content. The solid's content of each coating in the wet-state is set forth in Table 5—the percentages are given in weight percent. Additionally, each wet-state coating formulation was evaluated for pH and density—as set forth in Table 2.

TABLE 5

|  | Comp. Ex. 4 | Comp. Ex. 5 | Comp. Ex. 6 | Comp. Ex. 7 | Comp. Ex. 8 | Comp. Ex. 9 | Ex. 2 | Ex. 3 |
|---|---|---|---|---|---|---|---|---|
| Solid Content Amount | 65.2 | 64.9 | 63.9 | 63.7 | 66.5 | 64.8 | 64.7 | 64.7 |

TABLE 5-continued

|  | Comp. Ex. 4 | Comp. Ex. 5 | Comp. Ex. 6 | Comp. Ex. 7 | Comp. Ex. 8 | Comp. Ex. 9 | Ex. 2 | Ex. 3 |
| --- | --- | --- | --- | --- | --- | --- | --- | --- |
| Liquid Carrier Amount | 34.8 | 35.1 | 36.1 | 36.3 | 33.5 | 35.2 | 35.3 | 35.3 |
| Total | 100 | 100 | 100 | 100 | 100 | 100 | 100 | 100 |
| Density (lb./gal) | 11.0 | 12.4 | 12.1 | 12.4 | 11.8 | 8.4 | 11.9 | 12.6 |
| pH | 8.61 | 8.83 | 8.71 | 8.67 | 6.04 | 8.38 | 8.36 | 8.67 |

Each coating formulating was then applied to a substrate and dried, whereby the dried coating was evaluated for opacity and color L, a, b, y values—the evaluation values are set forth below in Table 6.

TABLE 6

|  | Comp. Ex. 4 | Comp. Ex. 5 | Comp. Ex. 6 | Comp. Ex. 7 | Comp. Ex. 8 | Comp. Ex. 9 | Ex. 2 | Ex. 3 |
| --- | --- | --- | --- | --- | --- | --- | --- | --- |
| Opacity | 99.1% | 99.3% | 98.8% | 99.5% | 98.2% | 99.1% | 99.3% | 99.3% |
| Color - White |  |  |  |  |  |  |  |  |
| L | 97.33 | 97.63 | 97.02 | 97.58 | 96.94 | 97.27 | 97.28 | 96.79 |
| a | −1.08 | −1.07 | −1.11 | −1.05 | −1.1 | −1.22 | −1.03 | −1.1 |
| b | 1.9 | 1.75 | 2.9 | 2.0 | 1.69 | 2.24 | 1.5 | 2.38 |
| Y | 93.24 | 93.98 | 92.49 | 93.38 | 92.31 | 93.11 | 93.14 | 37.93 |
| Color - Black |  |  |  |  |  |  |  |  |
| L | 96.55 | 97.18 | 96.26 | 96.94 | 97.03 | 96.52 | 96.98 | 97.35 |
| A | −1.29 | −1.22 | −1.34 | −1.41 | −1.15 | −1.29 | −1.25 | −1.21 |
| b | 1.19 | 1.6 | 0.9 | 1.73 | 1.1 | 1.52 | 1.27 | 1.38 |
| Y | 91.34 | 92.88 | 90.65 | 92.3 | 92.5 | 91.28 | 92.38 | 93.29 |

Each coating was further evaluated for antimicrobial characteristics—the results set forth below in Table 7. Qualitative analysis of antibacterial activity was demonstrated by following test methods as described in AATCC TM 147, as published by The American Association of Textile Chemists and Colorists (AATCC). Briefly, organisms were applied across agar plates and coated building panels were placed transversely across the inoculum streaks with the test surface of the coated building panel in contact with the inoculated agar surface. After incubation, test surfaces were evaluated for the presence of an inhibition zone and growth of test organism on the test surface. Inhibition zone may be calculated using the formula $W=(T-D)/2$, where W is the width of clear zone (in mm), T is the total diameter of test specimen and clear zone (in mm), and D is the diameter of the test specimen (in mm). No growth of the test organism beneath the sample surface indicates contact inhibition from the antimicrobial coating. Presence of an inhibition zone, or a clear area between the test surface and test organism, indicates migration of the antimicrobial treatment through the agar.

TABLE 7

|  | Comp. Ex. 4 | Comp. Ex. 5 | Comp. Ex. 6 | Comp. Ex. 7 | Comp. Ex. 8 | Comp. Ex. 9 | Ex. 2 | Ex. 3 |
| --- | --- | --- | --- | --- | --- | --- | --- | --- |
| *Staphylococcus aureus* |  |  |  |  |  |  |  |  |
| Inhibition Zone | N | N | N | N | N | N | Y | N |
| Growth | Y | Y | Y | Y | Y | Y | N | N |
| *Klebsiella pneumoniae* |  |  |  |  |  |  |  |  |
| Inhibition Zone | N | N | N | N | N | N | N | N |
| Growth | Y | Y | Y | Y | Y | Y | N | N |
| Mold Growth |  |  |  |  |  |  |  |  |
| Front | 8.0 | 8.6 | 5.6 | 8.0 | 0.0 | 7.0 | 9.0 | 9.0 |
| Back | 7.6 | 8.0 | 5.3 | 7.6 | 7.6 | 7.0 | 5.0 | 6.0 |

As demonstrated by Tables 6 and 7, the coating of Examples 2 and 3 exhibited excellent opacity at the same or potentially lower pigment loading percentages compared to Comparative Examples 4-9 while also exhibit similar color value performance. Additionally, the coatings of Examples 2 and 3 exhibit resistance to growth of both *Staphylococcus aureus* and *Klebsiella pneumoniae*, and the coatings of Examples 2 and 3 specifically exhibit a zone of inhibition with respect to *Staphylococcus aureus*. Moreover, the coatings of Examples 2 and 3 exhibit superior resistance to mold growth when present on the front surface of the building panel (with 10.0 being no growth and 0.0 being overrun with mold growth).

What is claimed is:

1. A building panel comprising:
    a substrate; and
    a coating applied to the substrate, the coating comprising a blend of:
        an antimicrobial composition present in an amount ranging from about 2 wt. % to about 15 wt. %, based on the total dry-weight of the coating;
        a polymeric binder comprising carboxylated polyvinyl acetate homopolymer;
        a rheology modifier comprising hydroxyethyl cellulose;
        a flame retardant comprising aluminum hydroxide; and
        a pigment blend;
        a hydrophobic agent comprising paraffin wax and polyethylene;
    wherein the antimicrobial composition consists of zinc borate.

2. The building panel according to claim 1, wherein the hydrophobic agent is present in an amount ranging from about 1 wt. % to about 8 wt. %.

3. The building panel according to claim 1, wherein the antimicrobial composition is present in an amount ranging from about 7 wt. % to about 12 wt. %, based on the total weight of the coating.

4. The building panel according to claim 1, wherein the coating is present on the substrate in an amount ranging from about 50 $g/m^2$ to about 400 $g/m^2$.

5. The building panel according to claim 1, wherein pigment is present in an amount ranging from about 40 wt. % to about 80 wt. %, based on the total weight of the coating.

6. The building panel according to claim 1, wherein the substrate is a porous structure and the building panel is an acoustical ceiling panel.

7. The building panel according to claim 6, wherein the porous structure comprises a fibrous material.

8. The building panel according to claim 1, wherein the coating is free of triazole compounds.

9. A ceiling system comprising:
    a support frame; and
    at least one building panel according to claim 1,
        wherein the building panel is supported by the support frame.

10. The building panel according to claim 1, wherein the pigment blend comprises a blend of titanium dioxide and calcium carbonate.

11. The building panel according to claim 1, wherein the substrate comprises mineral wool.

12. The building panel according to claim 1, wherein the rheology modifier is present in an amount ranging from about 0.1 wt. % to about 0.5 wt. % based on the total dry-weight of the coating.

* * * * *